United States Patent
Chen et al.

(10) Patent No.: US 6,631,465 B1
(45) Date of Patent: Oct. 7, 2003

(54) METHOD AND APPARATUS FOR INSTRUCTION RE-ALIGNMENT USING A BRANCH ON A FALSEHOOD OF A QUALIFYING PREDICATE

(75) Inventors: William Y. Chen, Sunnyvale, CA (US); Dong-Yuan Chen, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 549 days.

(21) Appl. No.: 09/607,684

(22) Filed: Jun. 30, 2000

(51) Int. Cl.$^7$ ................................................ G06F 9/38
(52) U.S. Cl. .................... 712/234; 712/241; 717/159; 717/160
(58) Field of Search ................ 712/234, 236, 712/241; 717/150, 159, 160

(56) References Cited

U.S. PATENT DOCUMENTS 5,937,195 A * 8/1999 Ju et al. .................... 717/156
5,999,738 A * 12/1999 Schlansker et al. ......... 717/156

OTHER PUBLICATIONS

Pnevmatikatos et al., Guarded Execution and Branch Prediction in Dynamic ILP Processors, Proceedings of the 21st Annual Symposium on Computer Architecture, IEEE, pp. 120–129, 1994.*

Mahlke et al., Effective Compiler Support for Predicated Execution Using the Hyperblock, Proceedings of the 25$^{th}$ annual International Symposium on Microarchitecture, IEEE, pp.45–54, 1992.*

Tirumalai et al., Parallelization of Loops with Exits on Pipelined Architectures, Proceedings of the 1990 Conference on Supercomputing, IEEE, pp. 200–212, 1990.*

Mahlke et al. A Comparison of Full and Partial Predicated Execution Support for ILP Processors, Proceedings of the 22nd Annual International Conference on Computer Architecture, IEEE, pp. 138–150, 1995.*

Vasanth Bala, Evelyn Duesterwald, Sanjeev Banerjia, "Transparent Dynamic Optimization: The Design and Implementation of Dynamo", HP Laboratories Cambridge, HPL–1999–78, Jun., 1999.

* cited by examiner

*Primary Examiner*—William M. Treat
(74) *Attorney, Agent, or Firm*—Blakely, Sokoloff, Taylor & Zafman LLP

(57) ABSTRACT

A method and apparatus that provides instruction re-alignment using a branch on a falsehood of a qualifying predicate. A complementary predicate related to a qualifying predicate is determined to be available. Instructions are re-aligned using a branch on a falsehood of the qualifying predicate if the complementary predicate is not available. Thus, a complementary predicate does not have to be generated to re-align instructions if no complementary predicate is available for the qualifying predicate.

20 Claims, 5 Drawing Sheets

METHOD AND APPARATUS FOR INSTRUCTION RE-ALIGNMENT USING A BRANCH ON A FALSEHOOD OF A QUALIFYING PREDICATE

FIELD OF THE INVENTION

The present invention relates generally to digital processing. More particularly, the present invention relates to code generating and code sequencing. Specifically, the present invention relates to a method and apparatus for instruction re-alignment using a branch on a falsehood of a qualifying predicate.

BACKGROUND OF THE INVENTION

A common operation for a digital processing system is running a program. The program code for the program is first compiled into code sequences ("instructions"), which are aligned or stored sequentially in "blocks" of memory. A processor processes the instructions to execute the program. For an instruction block having a conditional branch, the program control flow can either "fall-through" to the next sequential instruction block or "jump" to an instruction block at some offset from the instruction block having the conditional branch.

Typically, whether a conditional branch "falls-through" or "jumps" is dependent on the value of a guarding predicate for the conditional branch. That is, if the guarding predicate is "true" the conditional branch "jumps" to a target instruction ("target instruction") and if the guarding predicate is "false" the conditional branch "falls-through" to the next sequential instruction ("fall-through instruction"). Consequently, in many instances, it is necessary to re-align the target instruction with the fall through instruction in a memory without changing the original semantics of the program code (i.e., to make the original fall-through instruction the target instruction and to make the original target instruction the fall-through instruction).

FIG. 1 depicts a prior art illustration 100 of re-aligning instruction blocks. The prior art illustration 100 shows how the target instruction can be re-aligned with the fall through instruction by using a complementary predicate (i.e., pF) of a qualifying predicate (i.e., pT) to guard the conditional branch. Complementary predicates are generated by compare instructions (e.g., pT, pF=compare (a>b)) in which the complementary predicates have opposite logic values. For example, using the compare instruction above, if "a" is greater than "b" the guarding predicate (pT) is true and its complementary predicate (pF) is false. Furthermore, if "a" is not greater than "b" the guarding predicate (pT) is false and its complementary predicate (pF) is true. In the prior art, the target instruction can be re-aligned with the fall through instruction by guarding the conditional branch with the complementary predicate (pF) instead of the qualifying predicate.

Referring to FIG. 1, logical representation of code sequencing 102 represents five instructions (A through E) to be executed by a processor. Instruction A has a conditional branch for either instruction block B or C. Physical layout in memory 103 show how instructions A through E are laid out in a memory for one implementation. In the implementation of physical layout in memory 103, the conditional branch of instruction A "jumps" to instruction C ("target instruction") if the qualifying predicate (pT) is true and "falls-through" to instruction B ("fall through instruction") if pT is not true.

To re-align the target instruction (instruction C) with the fall-through instruction (instruction B) in the implementation of physical layout in memory 103, the conditional branch of instruction A must be guarded by the complementary predicate (pF) of the qualifying predicate (pT). The re-aligned layout in memory 106 shows instruction A being guarded by the complementary predicate (pF) to jump to instruction B ("target instruction") and to fall-through to instruction C ("fall-through instruction") if pF is true.

A disadvantage of the prior art of re-aligning instructions is that it requires a complementary predicate for the qualifying predicate. That is, if a complementary predicate is not available for the qualifying predicate, the complementary predicate must be generated in order to re-align the instructions. Consequently, generating the complimentary predicate for a qualifying predicate can be problematic if compare instructions are complicated and cascaded. Thus, more instructions may be need to produce the complimentary predicate, which translates into additional resource usage and additional processing time.

BRIEF DESCRIPTION OF THE DRAWINGS

The features and advantages of the present invention are illustrated by way of example and not limited in the figures of the accompanying drawings in which like references indicate similar elements, and in which.

DETAILED DESCRIPTION

A method and apparatus that provides instruction re-alignment using a branch on a falsehood of a qualifying predicate is described. A complementary predicate related to a qualifying predicate is determined to be available. Instructions are re-aligned using a branch on a falsehood of the qualifying predicate if no complementary predicate is available.

The instruction re-alignment techniques described herein avoid generating complementary predicates to re-align instructions if complementary predicates are not available for qualifying predicates. Thus, re-aligning instructions can be accomplished if there is no complementary predicate for a qualifying predicate. The instruction re-alignment techniques described herein can also yield improved code alignment, which improves pipeline and cache performance. Furthermore, the instruction re-alignment techniques can also increase optimization because of using less compare instructions to generate complementary predicates if none are available.

In addition, the instruction re-alignment techniques described herein may be implemented using Intel® family processors such as, for example, Intel® processors having the IA-64 (64-bit processor) architecture. Nevertheless, the instruction re-alignment techniques may be implemented for other types of processors, such as, for example, 32-bit processors, having similar instruction sets.

Figure 1:
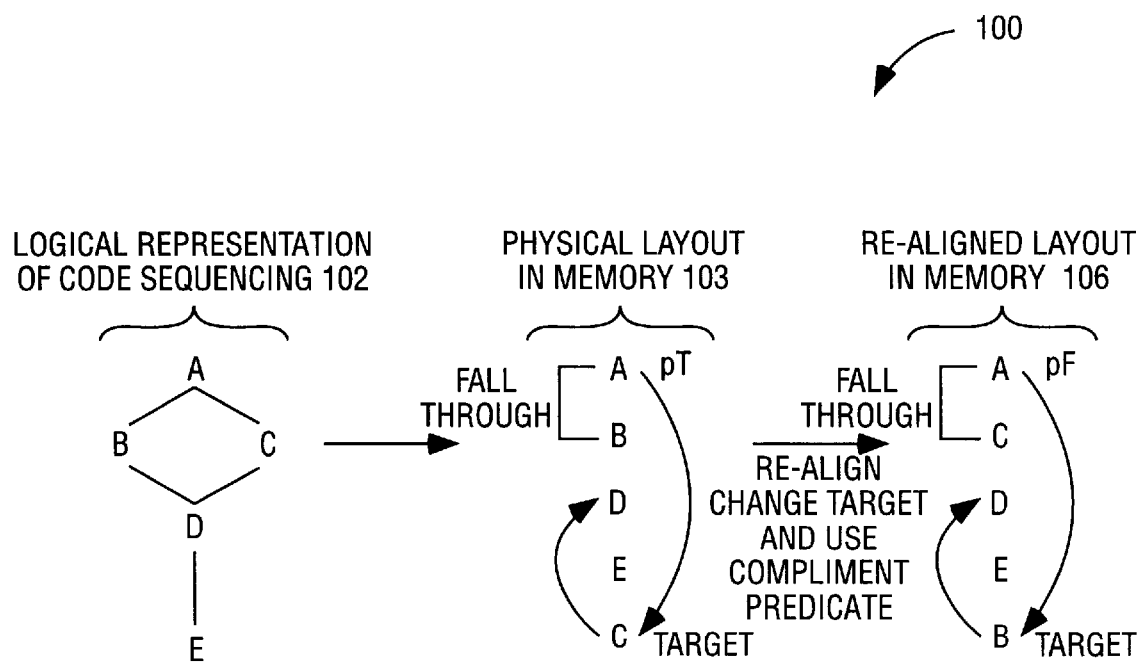
FIG. 1 depicts a prior art illustration of re-aligning instruction blocks.
Figure 2:
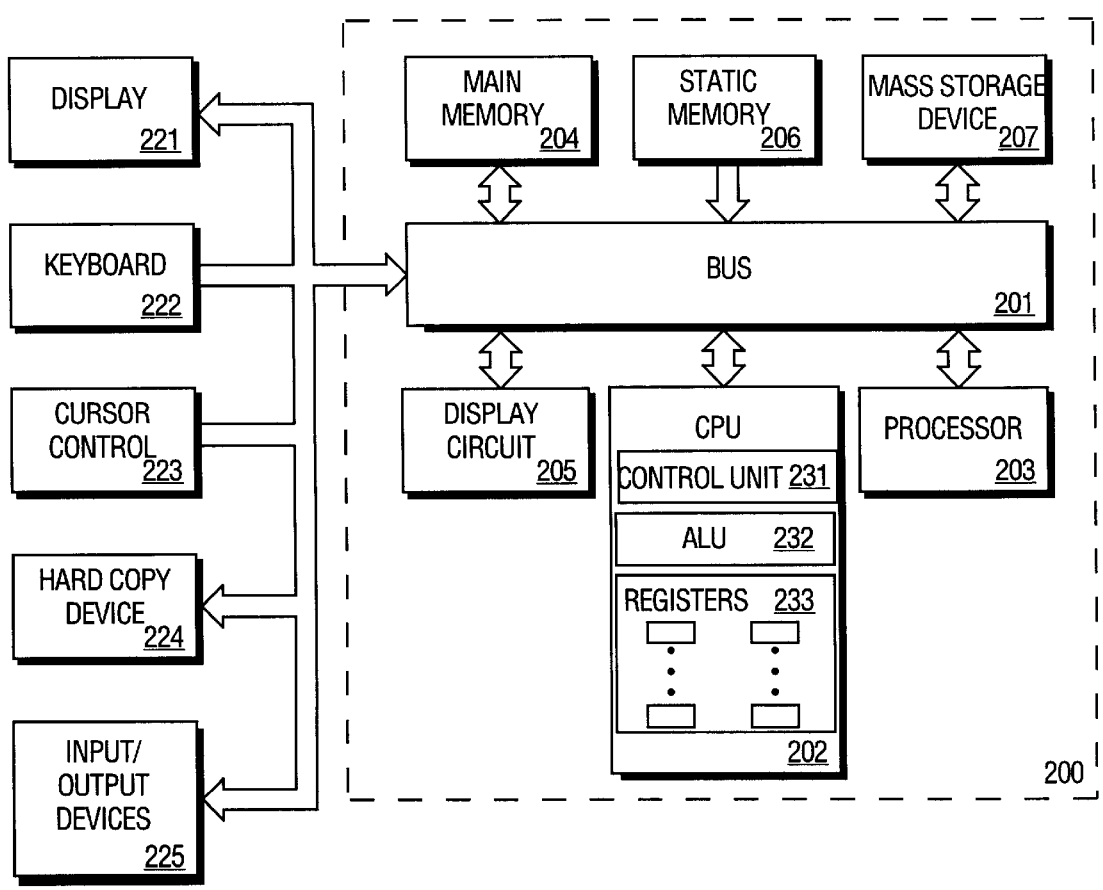
FIG. 2 depicts an exemplary digital processing system in which the present invention can be implemented.

FIG. 2 depicts an exemplary digital processing system 200 in which the present invention can be implemented. For one embodiment, the instruction re-alignment techniques can be implemented on a personal computer architecture. Referring to FIG. 2, digital processing system 200 includes a bus 201 or other communication means for communicating information, and a central processing unit (CPU) 202 coupled with bus 201 for processing information. CPU 202 includes a control unit 231, an arithmetic logic unit (ALU) 232, and several registers 233. For example, registers 233 may include predicate registers, spill and fill registers, floating point registers, integer registers, general registers, and other like registers. CPU 202 can be used to implement the instruction re-alignment techniques described herein. Furthermore, another processor 203 such as, for example, a coprocessor, can be coupled to bus 201 for additional processing power and speed.

Digital processing system 200 also includes a main memory 204, which may be a random access memory (RAM) or some other dynamic storage device, that is coupled to bus 201. Main memory 204 may store information and instructions to be executed by CPU 202. Main memory 204 may also store temporary variables or other intermediate information during execution of instructions by CPU 202. Digital processing system 200 also includes a static memory 206 such as, for example, a read only memory (ROM) and/or other static storage device, that is coupled to bus 201 for storing static information and instructions for CPU 202. A mass storage device 207, which may be a hard or floppy disk drive, can also be coupled to bus 201 for storing information and instructions.

A display 221, such as a cathode ray tube (CRT), can be coupled to bus 201. Display device 221 is used to display information to a computer user. A keyboard 222 or other alphanumeric input device may also be coupled to bus 201 for communicating information and command selections to CPU 202. A cursor control 123, such as a mouse, a trackball, or cursor direction keys, may be coupled to bus 201 for communicating direction information and command selections to CPU 202 and for controlling cursor movement on display 221. Another device which may be coupled to bus 201 is hard copy device 224 which may be used for printing instructions, data, or other information on paper, film, or some other storage medium. A number of input/output devices 225 may also be coupled to bus 201.

In the following description, instructions, instruction code, and code sequences can be stored on a machine-readable medium. A machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, and other like signals).

Figure 3:
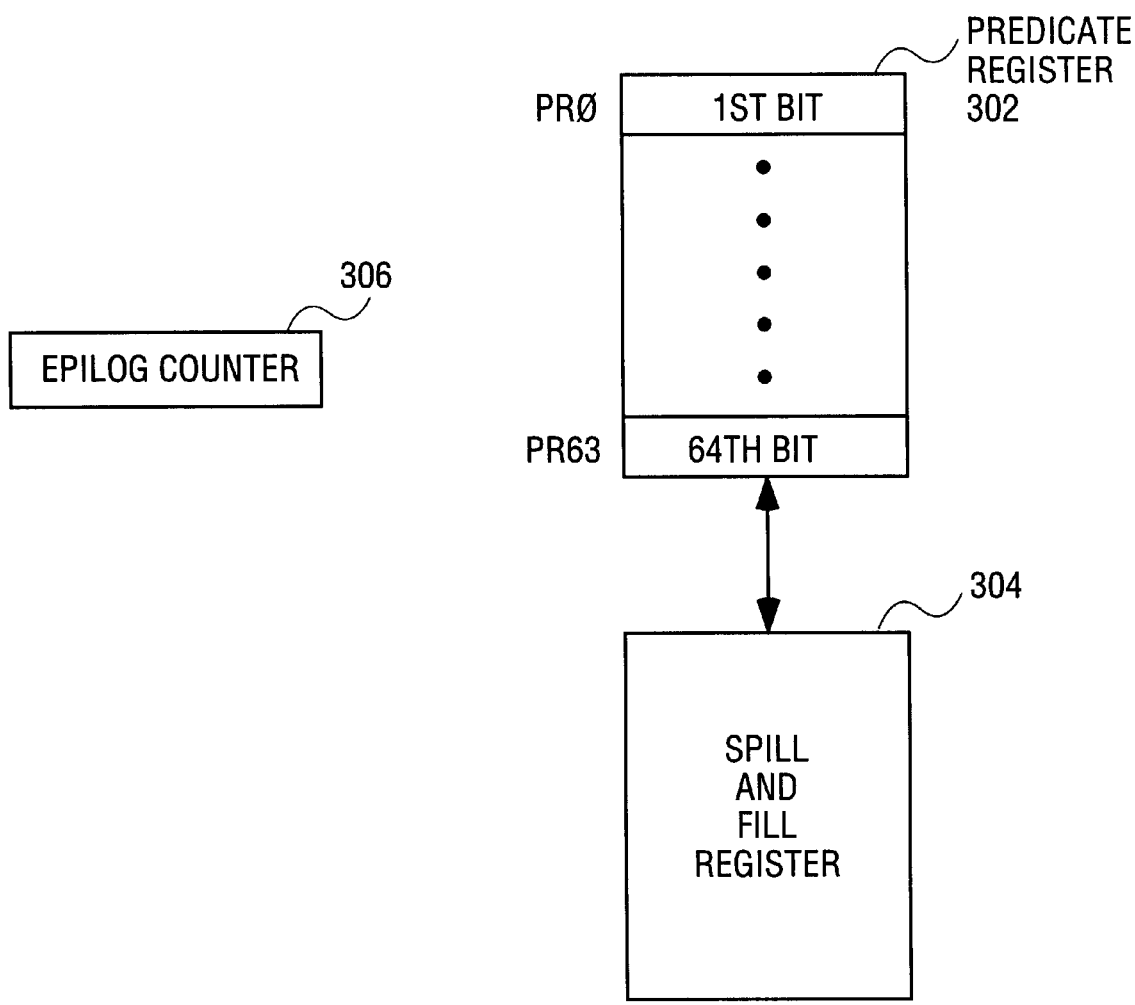
FIG. 3 depicts exemplary hardware (predicate register, spill and fill register, and epilog counter) for practicing the present invention.

FIG. 3 depicts exemplary hardware (predicate register, spill and fill register, and epilog counter) for practicing the present invention. It should be noted that other components and interconnections are not shown as not to obscure the present invention.

Referring to FIG. 3, a predicate register.302, spill and fill register 304, and epilog counter 306 are shown. Predicate register 302 includes 64 1-bit predicate registers (PR0 through PR63). For one embodiment, PR0 is always set to "1." The predicate registers PR0 through PR63 operate to store values for qualifying and complementary predicates. For example, predicate registers PR1 and PR2 can store complementary predicates (pT and pF) for a compare instruction.

Spill and fill register 304 are registers to save values for predicate registers PR0 through PR63 in predicate register 302. Spill and fill register 304 also restores values for predicate registers PR0 through P63 in predicate register 302 using stored values. Epilog counter 306 is used in connection with an existing loop branch instruction "br.wexit" to allow a conditional branch to "jump" on a falsehood of a qualifying predicate. That is, if a qualifying predicate is false and epilog counter 306 is set to zero, the "br.wexit" instruction can allow a "jump" to a target instruction on the falsehood of the qualifying predicate.

Figure 4:
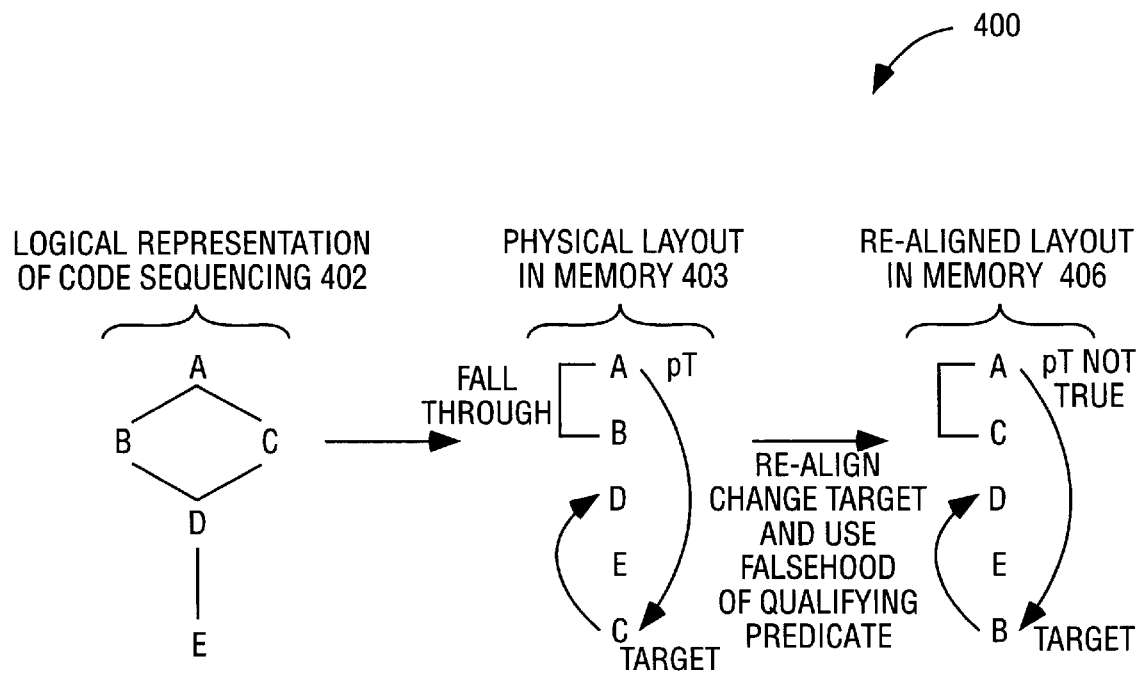
FIG. 4 depicts an illustration of re-aligning instruction blocks according to one embodiment.

FIG. 4 depicts an illustration 400 of re-aligning instruction blocks according to one embodiment. The illustration 400 shows how the target instruction can be re-aligned with the fall through instruction by using a falsehood of a qualifying predicate. Thus, a complementary predicate for the qualifying predicate does not have to be generated to realign instructions.

Referring to FIG. 4, logical representation of code sequencing 402 represents five instructions (A through E) to be executed by CPU 202. Instruction A has a conditional branch for either instruction block B or C. Physical layout in memory 403 show how instructions A through E are laid out in a memory for one implementation. In the implementation of physical layout in memory 403, the conditional branch of instruction A "jumps" to instruction C ("target instruction") if the qualifying predicate (pT) is true and "falls-through" to instruction B ("fall through instruction") if pT is not true.

To re-align the target instruction (instruction C) with the fall-through instruction (instruction B) in the implementation of physical layout in memory 403, the conditional branch of instruction A can be guarded by the falsehood of the qualifying predicate (pT) without generating the complementary predicate. The re-aligned layout in memory 406 shows instruction A being guarded by the falsehood of the qualifying predicate. That is, if pT is not true, the conditional branch "jumps" to instruction B ("target instruction") and "falls-through" to instruction C ("fall-through instruction") if pT is false. The above re-alignment techniques use an existing loop branch instruction "br.wexit" to allow the conditional branch to "jump" on the falsehood of the qualifying predicate pT, which will be described in detail below with regards to FIG. 5.

Figure 5:
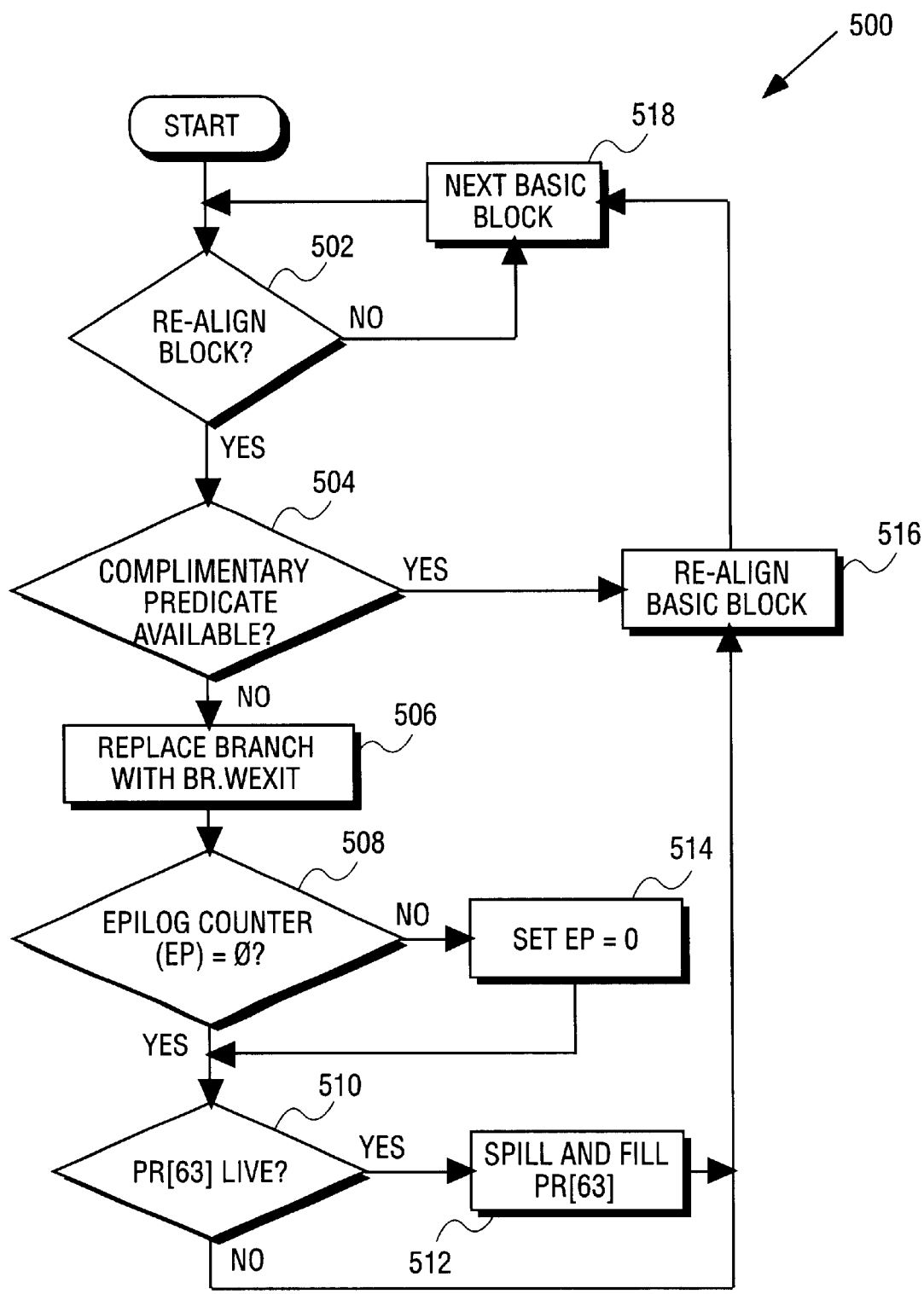
FIG. 5 depicts a flow chart illustrating an exemplary operation for re-aligning instruction blocks using a branch on a falsehood of a qualifying predicate.

FIG. 5 depicts a flow chart illustrating an exemplary operation 500 for re-aligning instruction blocks using a branch on a falsehood of a qualifying predicate. Operation 500 allows code sequences (instructions) to be re-aligned without generating complementary predicates. For purposes of explanation, operation 500 assumes each instruction block is guarded by a qualifying predicate and operation 500 begins at operation 502.

Referring to FIG. 5, at operation 502, an instruction block having a conditional branch in a code sequence is determined to be re-aligned in memory. If the instruction block is not to be re-aligned, at operation block 518, operation 500 goes to the next instruction block and continues with operation 502.

At operation block 504, if an instruction block having a conditional branch is to be re-aligned, a determination is made if there is a complementary predicate for the qualifying predicate. If there is a complementary predicate, at operation 516, an original target instruction can be re-aligned with an original fall through instruction by guarding the conditional instruction with a the complementary predicate. The operation then continues to operations 518 and 502.

At operation block 506, if there is no complementary predicate available, the operation continues to operation 506. Since it is improbable to add a new branch ("jump") on a falsehood of a qualifying predicate, an existing loop branch instruction ("br.wexit") can be used to achieve the same effect. Thus, at operation 506, the conditional branch is replaced with an existing branch instruction "br.wexit" and continues to operation 508.

The "br.wexit" instruction is designed to be used inside a software-pipelined loop where there are early exits within the loop body. For example if the qualifying predicate is false and the epilog counter is less than or equal to "1", "br.wexit" exits the loop with the side effect of setting predicate register PR63 to false. Thus, to use "br.wexit" as a branch on the falsehood of the qualifying predicate, the epilog counter 306 has to be set to zero and predicate register PR63 is not alive across the branch.

For the epilog counter 306 to be at zero, two conditions must exist. First, there are no software pipeline loops using the epilog counter 306 in the compilation scope. In this case, it is up to the compiler to set epilog counter 306 to zero for the instruction affected by "br.wexit". Second, the epilog counter 306 is being used in compilation, which guarantees that epilog counter 306 is set to zero upon exiting the software-pipelined loop.

At operation 508, if epilog counter 306 is not at zero, at operation 514, CPU 202 sets epilog counter 306 to zero and continues to operation 510. At operation 510, since epilog counter 306 is set to zero, CPU 202 then determines if predicate register PR63 is live (i.e., is PR63 register being used).

If PR63 register is not live, the operation continues at operation 516. If PR63 predicate register is live, the value in PR63 predicate register is spilled ("saved") in spill and fill register 304. The value of PR63 predicate register can be filled ("restored") back into predicate register 302 and then the operation continues at operation 516 such that the condition branch can jump on a falsehood of the qualifying predicate using the br.wexit function.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
   determining if a complementary predicate related to a qualifying predicate is available; and
   re-aligning instructions using a branch on a falsehood of the qualifying predicate if the complementary predicate is not available.

2. The method of claim 1, wherein re-aligning instructions using the branch on the falsehood of the guarding predicate includes re-aligning a target instruction with a fall-through instruction.

3. The method of claim 1, further comprising:
   re-aligning the instructions using the complementary predicate if the complementary predicate is available.

4. The method of claim 3, re-aligning the instructions using the complementary predicate includes re-aligning a target instruction with a fall-through instruction.

5. The method of claim 1, wherein re-aligning instructions includes re-aligning the instructions in a memory.

6. An apparatus comprising:
   a memory to store blocks of instructions; and
   a processor to determine if a complementary predicate related to a qualifying predicate is available and to re-align blocks of instructions in the memory using a branch on a falsehood of the qualifying predicate if the complementary predicate is not available.

7. The apparatus of claim 6, wherein the processor is to re-align a target instruction block with a fall-through instruction block using the falsehood of the qualifying predicate.

8. The apparatus of claim 6, wherein the processor is to re-align blocks of instructions using the complementary predicate if the complementary predicate is available.

9. The apparatus of claim 8, wherein the processor is to re-align a target instruction with a fall-through instruction using the complementary predicate.

10. The apparatus of claim 6, wherein the processor is a 32-bit processor or a 64-bit processor.

11. A machine-readable medium that provides instructions, which when executed by a machine, cause the machine to perform operations comprising:
    determining if a complementary predicate related to a qualifying predicate is available; and
    re-aligning instructions using a branch on a falsehood of the qualifying predicate if the complementary predicate is not available.

12. The machine-readable medium of claim 11 to cause the machine to further perform the operations including:
    re-aligning a target instruction with a fall-through instruction using the falsehood of the qualifying predicate.

13. The machine-readable medium of claim 11 to cause the machine to further perform the operations including:
    re-aligning the instructions using the complementary predicate if the complementary predicate is available.

14. The machine-readable medium of claim 11 to cause the machine to further perform the operations including:
    re-aligning a target instruction with a fall-through instruction using the complementary predicate if the complementary predicate is available.

15. The machine-readable medium of claim 11 to cause the machine to further perform the operations including:
    re-aligning the instructions in a memory.

16. A digital processing system comprising:
    a memory to store blocks of instructions;
    a predicate register to store predicates that guard blocks of instructions in the memory; and
    a processor to determine if a complementary predicate related to a qualifying predicate is available in the predicate register and to re-align blocks of instructions in the memory using a branch on a falsehood of the qualifying predicate if the complementary predicate is not available in the predicate register.

17. The digital processing system of claim 16, further comprising:
    an epilog counter to count loop iterations; and
    a spill and fill register to store predicate values in the predicate register and to restore values in the predicate register with the stored predicate values.

18. The digital processing system of claim 17, wherein the processor is to use the epilog counter and the spill and fill register to re-align blocks of instructions using the falsehood of the qualifying predicate.

19. The digital processing system of claim 16, wherein the processor is to re-align blocks of instructions using the complementary predicate if the complementary predicate is available.

20. The digital processing system of claim 16, wherein the processor is a 32-bit processor or a 64-bit processor.

* * * * *